Dec. 10, 1940.    R. R. WEDDELL    2,224,173
INSERTED BLADE CUTTER
Original Filed Feb. 11, 1935    2 Sheets-Sheet 1
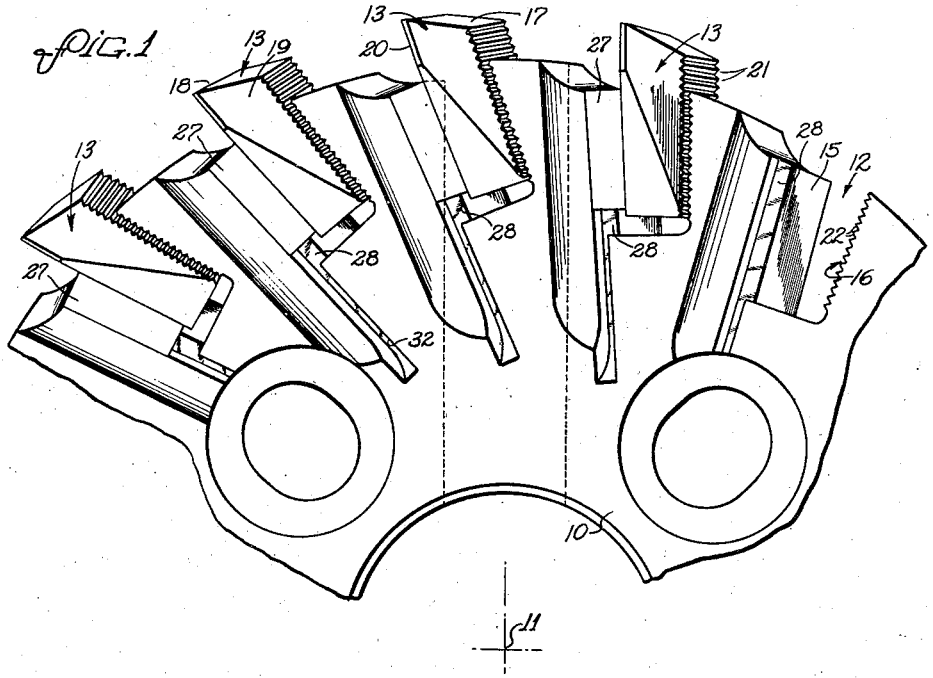
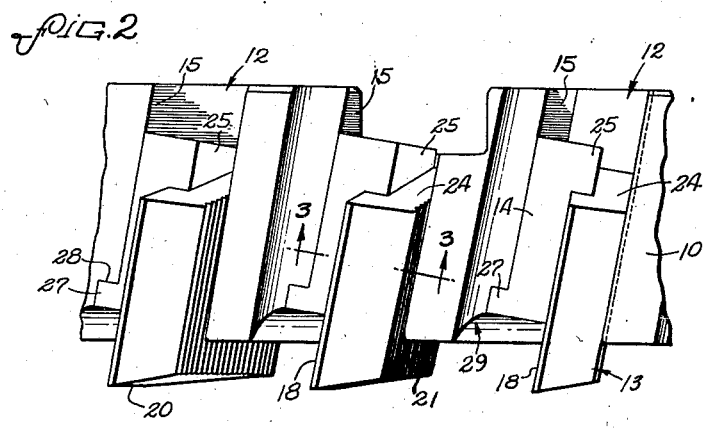
INVENTOR
Ralph R. Weddell
By Parker, Carlson, Pitzner & Hubbard
ATTORNEYS Dec. 10, 1940.  R. R. WEDDELL  2,224,173
INSERTED BLADE CUTTER
Original Filed Feb. 11, 1935  2 Sheets-Sheet 2
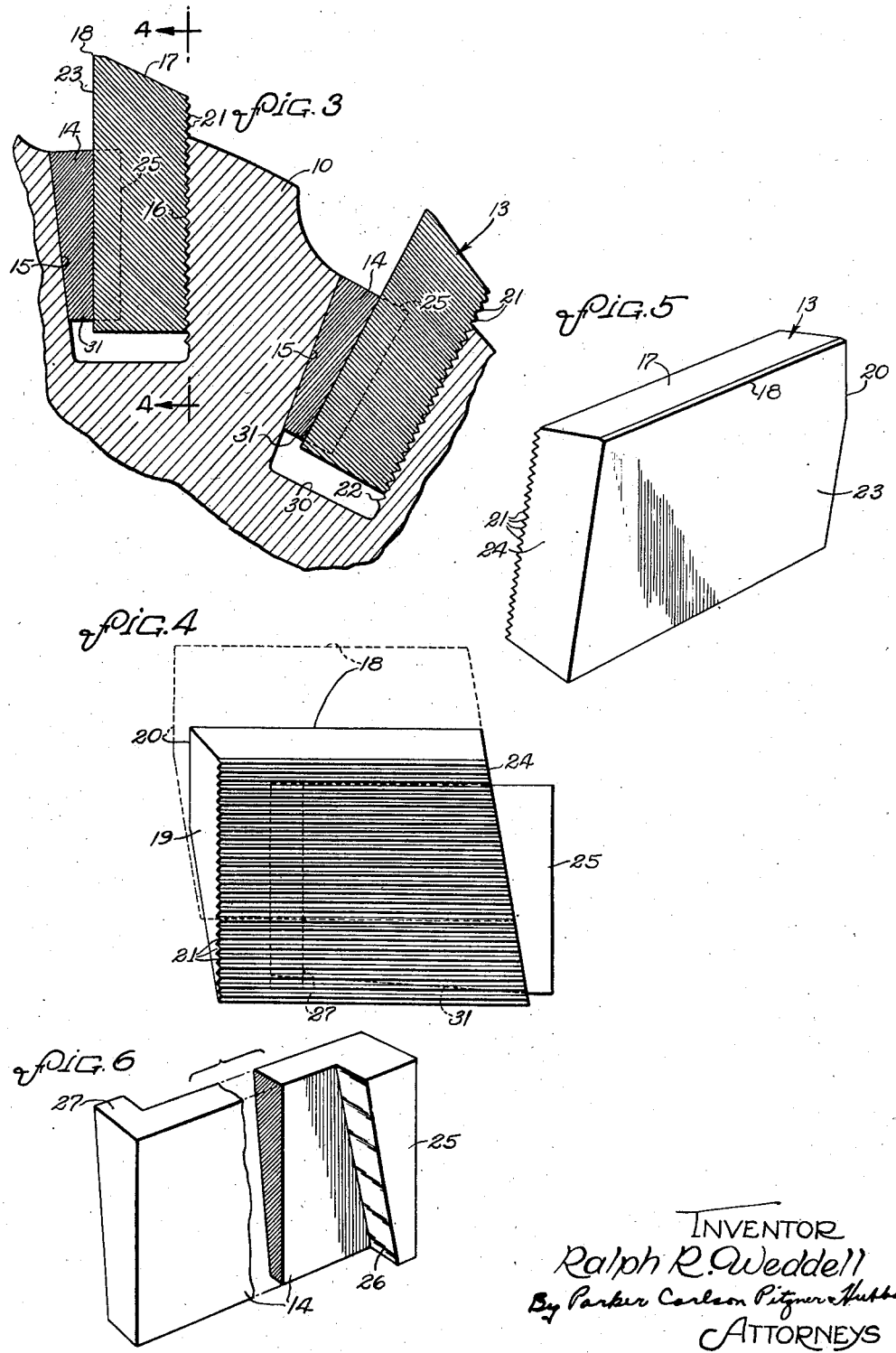
INVENTOR
Ralph R. Weddell
By Parker Carlson Pitzner Hubbard
ATTORNEYS Patented Dec. 10, 1940

2,224,173

UNITED STATES PATENT OFFICE 2,224,173

INSERTED BLADE CUTTER

Ralph R. Weddell, Rockford, Ill., assignor to The Ingersoll Milling Machine Company, Rockford, Ill., a corporation of Illinois Application February 11, 1935, Serial No. 5,914
Renewed January 5, 1939

9 Claims. (Cl. 29—105)

This invention relates to cutters of the so-called inserted blade type and has more particular reference to those in which provision is made for adjustment of the blades in a plurality of directions of wear.

The general object of the invention is to provide in a cutter of the above character a new and improved blade mounting which is simple and inexpensive to construct, which positively locks the blade against dislocation under the forces encountered in service use, which enables the blades to be renewed or reset easily and without the addition of other parts, which may be applied to all cutters of the inserted blade type, and which enables the blades to be made of any kind of cutting material.

A more detailed object is to provide an inserted blade cutter in which adjustment for wear in one direction is effected through the provision of interfitting serrations on one side of the cutter blade and the adjacent wall of the blade recess, and adjustment of the blade in another or transverse direction is obtained by virtue of interengagement between the inner end surface of the blade and an abutment rigid with the cutter body.

The invention also resides in the novel construction of the cutter blade and of the wedge which permits of adjustment in the above manner.

Other objects and advantages of the invention will become apparent from the following detailed description taken in connection with the accompanying drawings, in which—

Figure 1 is a fragmentary elevational view of a face milling cutter embodying the features of the present invention.

Fig. 2 is a plan view of the cutter shown in Fig. 1.

Fig. 3 is a section taken along the line 3—3 of Fig. 2.

Fig. 4 is a section taken along the line 4—4 of Fig. 3.

Figs. 5 and 6 are perspective views of the blade and wedge.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the form selected for purposes of illustration, the invention is embodied in a face milling cutter comprising a body 10 adapted to be mounted for rotation about an axis 11 and formed around its periphery with annularly spaced slots or recesses 12 for receiving blades 13 which are locked in adjusted positions by wedges 14. The slots extend at the usual shear angle to the cutter axis and are defined by opposed side walls 15 and 16 which converge inwardly (see Fig. 3) toward the cutter axis to produce the small taper necessary for enabling the blades to be wedged in place.

The blades 13 each comprise a flat block of cutting material having one side surface 17 sloping to a cutting edge 18 and one end surface 19 sharpened to a cutting edge 20 which intersects the edge 18 substantially at right angles thereto. To provide means by which adjustment for wear of the edge 18 may be effected, the trailing side face of each blade is formed with serrations 21 extending in the general direction of and preferably substantially parallel to the cutting edge 18 and adapted to interfit with complemental serrations 22 formed in the side wall 16 of the blade opening.

The opposite side surfaces of each wedge 14 are disposed at a small angle relative to each other, and are received in the narrow inwardly tapered opening defined by the smooth or cutting face 23 of the blade and the opposed wall 15 of its recess. When the wedge is driven into place, the serrations 21 are forced firmly into interfitting relation with the serrations 22 positively locking the blade in the body with the bottom surface of the blade spaced above the bottom wall 30 of the recess 12. By loosening the wedge and setting out the blade one serration at a time, outward adjustment for wear at the edge 18 is provided for.

This invention contemplates outward adjustment of the cutting edge 20 in a novel manner and automatically as an incident to adjustment of the edge 18. This is accomplished through the interengagement of an abutment rigid with the cutter body and disposed in the blade recess for coaction with a surface 24 on the end of the blade opposite the cutting edge 20 being inclined relative to the blade serrations 21 at an angle such that the blade will be set out in an axial direction a predetermined distance each time the blade is set out one serration in a radial direction. To facilitate manufacture, the abutment is, in the present instance, carried by the wedge 14 and comprises a flange 25 rigid with the inner end of the wedge with its surface 26 adapted for contact with a substantial length of the blade surface 24 in all positions of adjustment of the blade.

The degree of adjustment of the edge 20 for each step of adjustment of the edge 18 is determined by the inclination of the surface 24 relative to the edge 20 and this may be proportioned as desired. In view of the smaller amount of wear occurring at the edge 20, the surface 24 is ordinarily inclined at a small angle to the edge 20 so that the distance through which the edge 20 is advanced is only a small part of the distance between adjacent serrations. This will be seen by comparison of the full and dotted line positions of the cutting edges 18 and 20 in Fig. 4.

To position the abutment 25 positively and enable the blade to be held firmly against displacement under the axially directed forces applied to the edge 20, a flange 27 is formed on the end of the wedge 14 opposite the flange 25 and projects in the opposite direction to the latter flange so as to overlie the side surface of the cutter body at the end of the blade opening. Herein the flange 27 is seated against a shoulder 28 formed by cutting away the side portion of the cutter body as indicated at 29 and forming slots 32 in the body. The wedge 14 is thus Z-shaped in form with one flange hooked around the shoulder 28 and the other hooked around the inner end 24 of the blade and thus disposed in an out of the way position.

To adjust the cutter for wear, the wedges are loosened by driving drift pins into tapered recesses defined by the bottom wall 30 (Figs. 3 and 4) of the blade recesses 12 and the bottom surfaces 31 of the wedges. With the wedges retracted sufficiently to disengage the interfitting serrations 21 and 22, the blades are set outwardly one serration. Then with the flanges 25 and 27 in engagement with the shoulder 28 and the inner end of the blade, each wedge is driven inwardly forcing the blade serrations 21 firmly into the serrations 22 and thereby tightly locking the blades in the body, the edge 20 being positioned accurately by the flanges 25 as the blades are thus tightened into place. Repeated adjustments may thus be made in successive steps until so much of the blade has been used that the rigidity of the mounting is impaired. It will be observed that the procedure of resetting the blades of the cutter is simple and may be made quickly and conveniently in the machine shop. Since the forces for loosening the blades and driving them back into place are applied to the wedges instead of to the blade proper, the danger of injury to the blades in resetting is eliminated, it being apparent that the wedges can be made of materials capable of withstanding these forces.

It will be observed that the blades themselves are of very simple construction and may be made at a low cost even when composed of materials which are difficult to form or machine. All of the blade surfaces are plain with the exception of the serrated one and do not need to be located relative to each other with a high degree of accuracy. The surfaces by which the wedging action is obtained are formed on the wedge 14 and the cutter body both of which may be machined readily. No compound tapers are employed so that no accurate machining of any of the wedge surfaces relative to each other is required. In fact, by virtue of the manner in which the plate is mounted and the double adjustment obtained, substantial tolerances are allowable in manufacture without detracting from the rigidity of the blade mounting.

The blade mounting provides for effective locking of the blade against loosening under the forces encountered in service use. This is for the reason that the blade is held positively by the abutment 25 against endwise movement under the forces applied to the cutting edge 20. By virtue of the inwardly extending taper of the wedge 15, the forces applied to the edge 18 tend to tighten the locking engagement between the interfitting serrations. At the same time, the mounting permits proper backing of the blades by proper extension of the wall 16 and enables adjustment in both directions of wear to be obtained without the use of additional parts such as shims or the like. Since the blades have smooth cutting faces, a maximum amount of the material in the blades may be utilized before replacement is necessary.

The blade mounting is further advantageous in that it can be applied to a wide variety of cutting tools such, for example, as staggered tooth cutters, side milling cutters, end mills, hollow milling cutters, and boring, reaming, and facing tools. For most of these applications, the blades will be mounted with the serrations 21 extending perpendicular to the direction of feed of the tool in which direction the greatest amount of wear occurs. Thus, in the case of end milling cutters, the major adjustment would be in the direction of the cutter axis. In other cutters such as hollow mills, the adjustment through the medium of the serrations would be inwardly instead of outwardly as in the face mill illustrated.

I claim as my invention:

1. A cutting tool comprising, in combination, a body having blade recesses opening outwardly, blades each comprising a block of cutting material disposed in one of said recesses with one side and one end projecting therefrom, cutting edges formed along the leading edges of said side and end, interfitting serrations formed in one side wall of said recess and the adjacent back surface of said blade and extending substantially parallel to one of said edges whereby to provide for step-by-step transverse adjustment of the latter, and a Z-shaped locking member for each blade comprising an intermediate section and oppositely projecting flanges at opposite ends, said intermediate section having tapering sides and being received between the leading face of the blade and the adjacent side wall of its recess whereby to wedge the blade serrations into the wall serrations, and said flanges respectively engaging a side of the cutter body and the inner end surface of the blade which is inclined at an acute angle to said serrations to provide for adjusting the other cutting edge for wear automatically as an incident to adjustment of the first mentioned edge through the medium of said serrations.

2. A cutting tool comprising, in combination, a body having blade recesses opening outwardly, blades each comprising a block of cutting material disposed in one of said recesses with one side and one end projecting therefrom, cutting edges formed along the leading edges of said side and end, interfitting serrations formed in one side wall of said recess and the adjacent back face of said blade and extending in the general direction of one of said edges whereby to provide for step-by-step transverse adjustment of the latter, a wedge received in the tapered opening defined by the leading face of said blade and the adjacent wall of the blade recess and having ends respectively projecting beyond the inner end of the blade and the side of said body from which the blade projects, and flanges on said projecting ends having surfaces engaging with the cutter body and the inner end surface of the blade, one of said flange surfaces and the end surface which it abuts being disposed at other than a right angle to said serrations and operating to advance the latter edge a predetermined distance each time the blade is moved outwardly one serration.

3. A rotary cutting tool comprising, in combination, a cylindrical body having blade recesses therein tapering inwardly towards the axis of rotation, blades comprising a block of cutting material disposed in said recesses with one side and one end projecting from said body, cutting edges formed along the leading edges of said side and end, the cutting edges on said sides being parallel to the inner sides of the blade and also to the axis of rotation, interfitting serrations formed in one side wall of the recesses and the adjacent back face of the blade extending parallel to the side cutting edge to provide for step-by-step transverse adjustment of the latter, a wedge received in said recess and disposed between the other wall of the recess and the front face of the blade to press said serrations into locking engagement when said side cutting edge is in the desired position, a rigid abutment extending at an acute angle with respect to said serrations, and means on said blade cooperating with said abutment, said means and said abutment serving to set the end cutting edge outwardly automatically as an incident to outward adjustment of said side cutting edge through the medium of said serrations.

4. A rotary cutting tool comprising, in combination, a cylindrical body having outwardly opening blade recesses therein, blades each comprising a block of cutting material disposed in one of said recesses with intersecting edge portions projecting from said body, the leading edges of said portions constituting first and second cutting edges, complemental adjusting means formed on one side wall of each recess and the adjacent wall of the blade therein and providing for outward step-by-step adjustment of said first edge in a transverse direction, a wedge received in said recess between the other wall thereof and the leading face of the blade to press said last mentioned means into locking engagement when said first cutting edge is in the desired position, an abutment in each recess rigid with said wedge, and an end surface on the inner end of each blade inclined relative to said second edge and coacting automatically with the abutment to locate the second edge automatically in different outward positions of adjustment through the medium of said adjusting means.

5. For locking a serrated cutter blade against a serrated wall of a recess in a rotary cutter body, a wedge adapted to be received between the blade and the opposite wall of said recess and having a flange at one end adapted to hook around an end face of said cutter body, and a flange at the opposite end providing an abutment surface adapted for engagement with the inner end of said blade and disposed at an acute angle to the direction in which the wedge is entered between said blade and body.

6. An inserted blade cutting tool comprising, in combination, a body having a blade recess, a blade comprising a block of cutting material disposed in said recess with one side and one end projecting therefrom, cutting edges formed along the leading edges of said side and end, the side walls of said recess converging inwardly from one of said edges, interfitting serrations formed in one side wall of said recess and the adjacent back surface of said blade and extending in the general direction of one of said edges whereby to provide for step-by-step transverse adjustment of the latter, a wedge received in the tapered opening defined by the leading face of said blade and the adjacent wall of said recess to press said serrations into locking engagement with one of said cutting edges in the desired position, and a rigid abutment in said recess adapted to occupy a fixed position with respect to said body and coacting automatically with the inner end surface of said blade as an incident to repositioning of the blade through the medium of said serrations to define predetermined different positions of adjustment of said other cutting edge each corresponding to a position of said first edge predetermined by one of said serrations.

7. An inserted blade cutting tool comprising, in combination, a body having a blade recess, a blade comprising a block of cutting material disposed in said recess with one side and one end projecting therefrom, cutting edges formed along the leading edges of said side and end, interfitting means on the blade and a wall of said recess coacting to permit the blade to be advanced step-by-step in a direction transversely of one of said edges, a wedge between said blade and a side wall of said opening to lock the blade in adjusted position, and an abutment on said wedge acting on the end of said blade opposite said second edge to adjust the latter automatically as an incident to adjustment of said first mentioned edge.

8. An inserted blade cutting tool comprising, in combination, a body having a blade recess, a blade comprising a block of cutting material disposed in said recess with one side and one end projecting therefrom, cutting edges formed along the leading edges of said side and end, serrations on said blade and one side wall of the blade recess extending longitudinally of one of said edges and interfitting to position one of said edges in said body, and a Z-shaped wedge inserted between said blade and the opposite wall of said recess to lock the blade in said body, said wedge having flanges at opposite ends respectively engaging one side face of said body beyond the end of the blade recess and the inner end surface of said blade and acting to locate said other edge in a predetermined relation to the position of said first mentioned edge.

9. An inserted blade cutting tool comprising, in combination, a body having a tapering blade recess, a blade comprising a block of cutting material disposed in said recess with one side projecting therefrom, a cutting edge formed along said side, interfitting serrations formed in one side wall of said recess and the adjacent back surface of said blade and extending in the general direction of said edge whereby to provide for step-by-step transverse adjustment of the latter, a wedge received in the tapered opening defined by the leading face of said blade and the adjacent wall of said recess to press said serrations into locking engagement with said cutting edge in the desired position, and a rigid abutment in said recess connected to and movable with said wedge and engaging the inner end surface of said blade to position the latter in a direction longitudinally of said edge automatically as an incident to locking of said serrations.

RALPH R. WEDDELL.